No. 781,465.                                          Patented January 31, 1905.

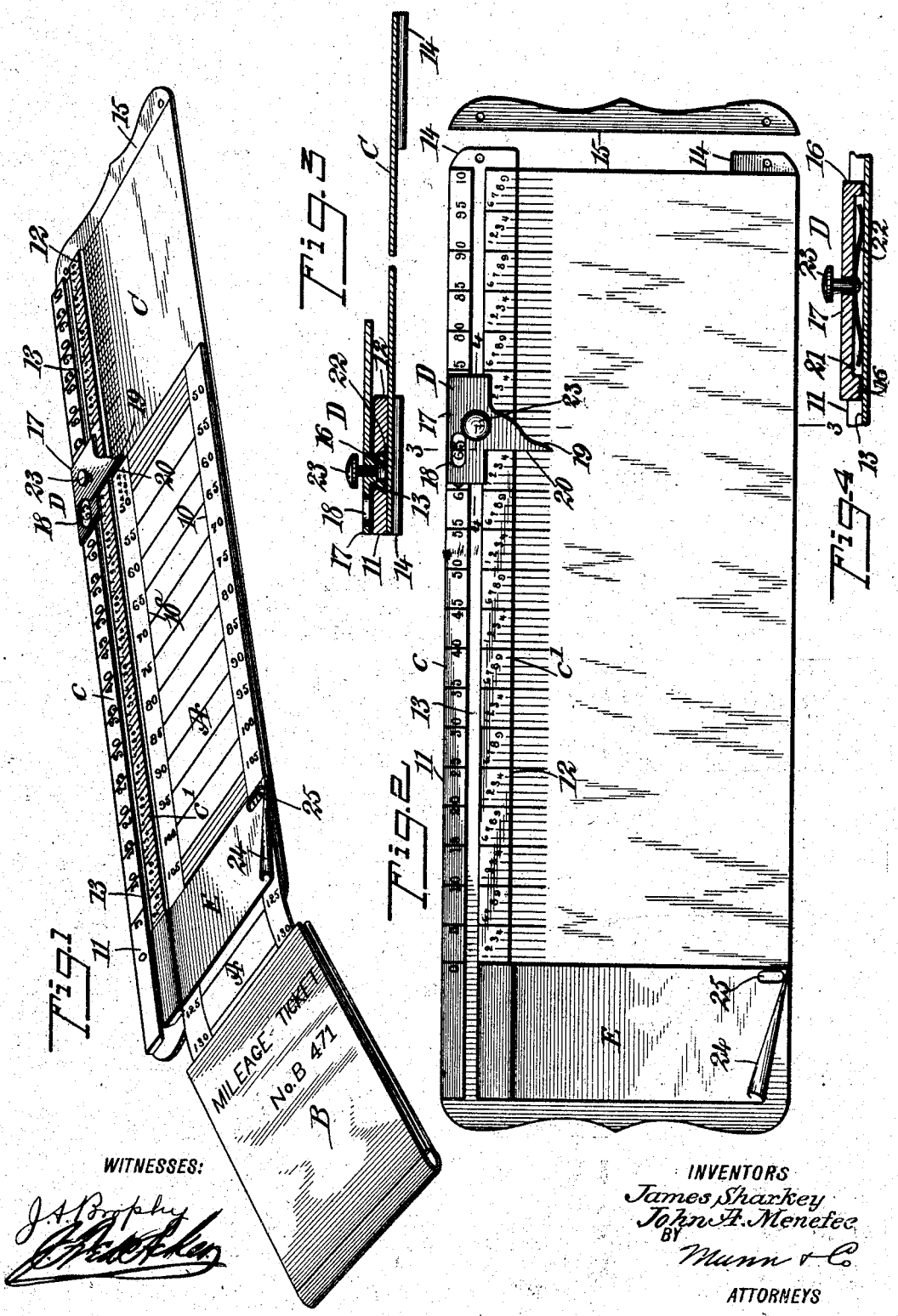

UNITED STATES PATENT OFFICE.

JAMES SHARKEY AND JOHN A. MENEFEE, OF EATON, OHIO.

MILEAGE-DETACHER.

SPECIFICATION forming part of Letters Patent No. 781,465, dated January 31, 1905.

Application filed November 12, 1904. Serial No. 232,461.

*To all whom it may concern:*

Be it known that we, JAMES SHARKEY and JOHN A. MENEFEE, citizens of the United States, and residents of Eaton, in the county of Preble and State of Ohio, have invented a new and Improved Mileage-Detacher, of which the following is a full, clear, and exact description.

The purpose of our invention is to provide an instrument for measuring and severing railroad-scrip, particularly mileage-scrip, and to so construct the instrument that it will be light and compact and may be conveniently carried, which will be accurate in operation, and can be readily and expeditiously operated.

Another purpose of the invention is to so construct the instrument that it will have no folding parts or parts liable to leave their supports and which is provided with an indicator movable with reference to scales on the instrument and scrip for the purpose of determining the section of the scrip to be severed from the body and wherein a cutter is so constructed and arranged with reference to a scale of miles on the scrip that it may be employed independent of the indicator to determine the length of the section to be detached from the body of the scrip when great rapidity of action is desired.

The invention consists in the novel construction and combination of the several parts, as will be hereinafter fully set forth, and pointed out in the claims.

Reference is to be had to the accompanying drawings, forming a part of the specification, in which similar characters of reference indicate corresponding parts in all the figures.

Figure 1 is a perspective view of the improved instrument and a portion of a mileage-scrip in position thereon. Fig. 2 is a plan view of an instrument, an end portion being removed. Fig. 3 is a transverse section taken practically on the line 3 3 of Fig. 2, and Fig. 4 is a longitudinal section taken substantially on the line 4 4 of Fig. 2.

A represents a mileage-scrip of the usual character, and B the covers between which the scrip is usually contained, the scrip being provided with the customary marginal scales 10 and $10^a$, indicating miles.

C represents the body of the instrument, which is in the form of a plate, and the said body may be made of any suitable material. The body C at its left-hand longitudinal edge is provided with a longitudinal rib 11 upon its upper face, and a parallel rib 12 is also secured to the upper face of the body. The space 13 between these two ribs is dovetail shape in cross-section, as is clearly shown in Figs. 1 and 3. A scale $c$ in miles is produced on the upper face of the rib 11 corresponding to the scales 10 and $10^a$ on the mileage-scrip A, and this scale $c$, which is the main scale of the instrument, reads in divisions of five—from "5" to "100," for example. A scale $c'$ is produced upon the upper face of the rib 12, reading in divisions of units—for example, "1, 2, 3, 4, 5, 6, 7, 8, 9." At the outer end of the body C two downwardly and horizontally extending lugs 14 are produced in order that a second plate may be added to the first plate to extend the scales when desired, in which event the upper faces of the two body-plates will be flush; but when the single body-plate C is used the said lugs 14 are covered by a finishing-strip 15. (Shown in position in Fig. 1 and detached in Fig. 2.)

In connection with the body-plate C an indicator D is employed, adapted to slide on the body-plate over the scales $c$ and $c'$. The indicator D is in the form of a plate having a dovetail longitudinal rib 16 formed on its under face, which dovetail rib 16 is adapted to enter and to slide in the correspondingly-shaped space 13, between the ribs 11 and 12, as is best shown in Fig. 3. The body 17 of the indicator extends over the scale $c$ and over a portion of the scale $c'$, as is best shown in Fig. 2, and is provided with a horizontal finger 19, which extends in direction of the center of the body C, and this finger 19 is provided with a flat edge 20, which is the reading edge of the finger and is adapted to be brought into alinement with any of the divisions on either of the scales. The body portion of the said indicator is provided with an opening 18 therein, through which any one numeral on the scale $c$ may be read. This indicator is held in position by means of a spring 22, which spring is located in a longitudinal chamber 21, formed in the dovetail rib 16, as is best shown in Fig. 4, and a stud 23 is attached to this spring and extends up through an opening in the body portion of the indicator, so that by pressing the stud 23 downward the spring 22 is relieved from locking tension and the indicator may be slid to any point desired on the scales. As soon as the stem 23 is relieved from pressure the spring 22 acts to hold the indicator in its adjusted position.

A cutter E is located at what may be termed the "forward end" of the body C, extending transversely across the body. This cutter is made of spring material and at its left-hand end is secured usually upon the rib 12, as is shown in Figs. 1 and 2, the said cutter being otherwise free. The free end of the cutter extends to the right-hand edge of the body C and is provided with an upturned section 24 at said end in order that the mileage-scrip may be readily passed beneath the said cutter. At the free end of the cutter near its inner edge a longitudinal slot 25 is made, which will show one of the numerals on the right-hand scale of the scrip when the scrip has been adjusted on the instrument, and the numeral thus appearing will indicate the number of miles that have been traveled.

In operation if, for example, as is shown in Fig. 1, coupons representing forty-five miles have been cut off from the scrip and sixty-five miles are to be traveled on the scrip the indicator is set so that "65" on the scale c will appear at the opening 18 at the body of the indicator and then the scrip is drawn along the body C until the end is in engagement with the working edge 20 of the finger 19 of the indicator, and then the scrip may be readily torn off at the cutter E, as coupons representing the sixty-five miles will be contained in that section which is severed, and the total number of miles traveled will then be indicated at the opening 25 in the cutter E—namely, one hundred and ten miles, being the sum of forty-five and sixty-five. Thus the opening 25 in the cutter gives a proof of correctness as to the position of that portion of the scrip which is to be torn off.

In the event much work is to be done with the instrument in a short space of time the indicator can be simply carried to the end of the body and left there, and the operator will at such time notice the number of miles indicated at the end coupon on the scrip and add to such numeral the number of miles that the owner of the scrip is to travel, and the scrip can then be drawn along the body until the sum thus computed appears at the opening 25 in the cutter.

Having thus described our invention, we claim as new and desire to secure by Letters Patent—

1. An instrument for measuring and severing railroad-scrip, consisting of a plate having a scale along one of its edges corresponding to the graduations on the scrip, and an indicator adapted to travel over the said scale, said indicator having an opening therein to expose a numeral on the scale and a surface against which an end of the scrip is to abut.

2. An instrument for measuring and severing railroad-scrip, consisting of a plate having a scale along one of its edges corresponding to the graduations on the scrip, an indicator adapted to travel over the said scale, said indicator having an opening therein to expose a numeral on the scale and a surface against which an end of the scrip is to abut, and a cutter located at one end of the body, the said cutter being fixed at one end but otherwise free of the body.

3. In an instrument for measuring and severing railroad-scrip, a plate having a scale along one of its edges corresponding to the graduations of the scrip, and a cutter located on the said plate, being fast thereto at one end, which cutter extends across the said plate and is provided with an opening therein adapted to expose a graduation on the scrip being measured.

4. In instruments for measuring and severing railroad-scrip, a plate, ribs at one side of the plate, having scales thereon corresponding to the graduations on the scrip to be measured, an indicator, comprising a body having an opening therein adapted to expose a graduation on one of the scales, and a finger which extends over the other scale and beyond its inner edge, a guide for the said indicator mounted to travel in the space between the ribs, and a tension-lock for the said indicator.

5. In instruments for measuring and severing railroad-scrip, a plate, ribs at one side of the plate, having scales thereon corresponding to the graduations on the scrip to be measured, an indicator comprising a body having an opening therein adapted to expose a graduation on one of the scales and a finger which extends over the other scale and beyond its inner edge, a guide for the said indicator, mounted to travel in the space between the ribs, a tension-lock for the said indicator, a spring-cutter located at one end of the body, one end of the said spring-cutter being secured to the body and the other end being free and upset, and provided with an opening adapted to expose a graduation on the scrip to be measured and severed.

In testimony whereof we have signed our names to this specification in the presence of two subscribing witnesses.

JAMES SHARKEY.
JOHN A. MENEFEE.

Witnesses:
W. B. MARSH,
CHAS. S. BLOOM.